United States Patent
Yang

(10) Patent No.: US 9,876,718 B2
(45) Date of Patent: Jan. 23, 2018

(54) FORWARDING PACKETS

(71) Applicant: Hangzhou H3C Technologies Co., Ltd., Hangzhou (CN)

(72) Inventor: Xiaopeng Yang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 161 days.

(21) Appl. No.: 14/768,429

(22) PCT Filed: Apr. 24, 2014

(86) PCT No.: PCT/CN2014/076119
§ 371 (c)(1),
(2) Date: Aug. 17, 2015

(87) PCT Pub. No.: WO2014/173309
PCT Pub. Date: Oct. 30, 2014

(65) Prior Publication Data
US 2016/0036702 A1 Feb. 4, 2016

(30) Foreign Application Priority Data
Apr. 25, 2013 (CN) .......................... 2013 1 0148480

(51) Int. Cl.
*H04L 12/741* (2013.01)
*H04L 12/947* (2013.01)
(Continued)

(52) U.S. Cl.
CPC ............ *H04L 45/745* (2013.01); *H04L 45/58* (2013.01); *H04L 49/15* (2013.01); *H04L 49/25* (2013.01)

(58) Field of Classification Search
None
See application file for complete search history.

(56) References Cited

U.S. PATENT DOCUMENTS

2011/0064086 A1* 3/2011 Xiong .................. H04L 49/351
370/401
2011/0299527 A1* 12/2011 Yu ....................... H04L 12/1886
370/390
(Continued)

FOREIGN PATENT DOCUMENTS

| CN | 102238083 | 11/2011 |
| CN | 102857425 | 1/2013 |
| CN | 103220215 | 7/2013 |

OTHER PUBLICATIONS

Eastlake, Donald, "RBridges and the IETF TRILL Protocol", https://www.nanog.org/meetings/nanog48/presentations/Monday/Eastlake_RBridge_N48.pdf, Dec. 2009.*

(Continued)

*Primary Examiner* — Faruk Hamza
*Assistant Examiner* — Cassandra Decker
(74) *Attorney, Agent, or Firm* — Hewlett Packard Enterprise Patent Department

(57) ABSTRACT

A first access switch in the first Fabric receives a notification sent by a second access switch in the first Fabric, and the notification includes a nickname of the second access switch. The first access switch identifies an egress interface to a TRILL path from the first access switch to an access switch corresponding to the nickname in the notification. The first access switch stores the egress interface to the TRILL path in a fiber channel (FC) forwarding table. The first access switch forwards a received FCoE packet by using the egress interface stored in the FC forwarding table. The FCoE packet is forwarded by the first access switch without encapsulation with a TRILL header.

20 Claims, 7 Drawing Sheets

(51) Int. Cl.
*H04L 12/933* (2013.01)
*H04L 12/775* (2013.01)

(56) References Cited

U.S. PATENT DOCUMENTS

| | | |
|---|---|---|
| 2012/0177044 A1 | 7/2012 | Berman |
| 2012/0177045 A1 | 7/2012 | Berman |
| 2013/0114600 A1* | 5/2013 | Koganti ................ H04L 49/357 370/392 |

OTHER PUBLICATIONS

International Search Report and Written Opinion dated Aug. 19, 2014, PCT Patent Application No. PCT/CN2014/076119 dated Apr. 24, 2014, The State Intellectual Property Office, P.R. China.

* cited by examiner

US 9,876,718 B2

FORWARDING PACKETS

CLAIM FOR PRIORITY

The present application is a national stage filing under 35 U.S.C 371 of PCT application number PCT/CN2014/076119, having an international filing date of Apr. 24, 2014, which claims the benefit of priority from Chinese Patent Application, No. 201310148480.1, having a filing date of Apr. 25, 2013, the disclosures of which are hereby incorporated by reference in their entireties.

BACKGROUND

FCoE (fiber channel over Ethernet) is a technique for network convergence which utilizes fiber channel packets to enable an FC SAN (storage area network) and an Ethernet LAN (local area network) to share a single integrated network infrastructure, thus solves problems stemming from co-existence of networks of different types.

In an FCoE/TRILL (transparent interconnection of lots of links) convergence network, switches on the access layer (also referred to as access switches) and switches on the convergence layer (also referred to as convergence switches) both serve as Rbridges (routing bridges) in the TRILL network. Access switches are equipped with FCoE functions, and convergence switches are not equipped with FCoE functions.

Access switches have FCoE forwarding capabilities and TRILL forwarding capabilities, but do not support performing TRILL forwarding on packets which have been through FCoE forwarding nor performing FCoE forwarding on packets which have been through TRILL termination processing. Conventional access switches generally adopt port loopback for forwarding FCoE packets in a TRILL network, i.e., FCoE packets can be forwarded in a TRILL network only through loopback ports of switches on the access layer. Loopback ports occupy port resources. Furthermore, performances of the loopback ports may become the factor that restricts the performances of FCoE forwarding.

BRIEF DESCRIPTION OF THE DRAWINGS

Features of the present disclosure are illustrated by way of example and not limited in the following figures, in which like numerals indicate like elements, in which.

DETAILED DESCRIPTIONS

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

The mechanism provided by examples of the present disclosure can implement forwarding FCoE packets in a TRILL network. The TRILL network may include access switches and convergence switches, and the access switches have FCoE forwarding capabilities. Access switches within the same Fabric (Fiber network) are interconnected logically through VE-ports (virtual Ethernet ports) in a full meshed manner. Access switches in the same Fabric are configured with identical FCoE VLAN (virtual local area network), and FCoE traffic in different Fabric are transported through different VLANs.

In an example, FCoE packets that were not processed by TRILL encapsulation are transported via TRILL paths between access switches and convergence switches. Access switches forward the FCoE packets by using FCF forwarding (i.e., FC-ID-based forwarding), and convergence switches forward the FCoE packets as normal Ethernet packets (i.e., MAC address-based forwarding).

Figure 1:
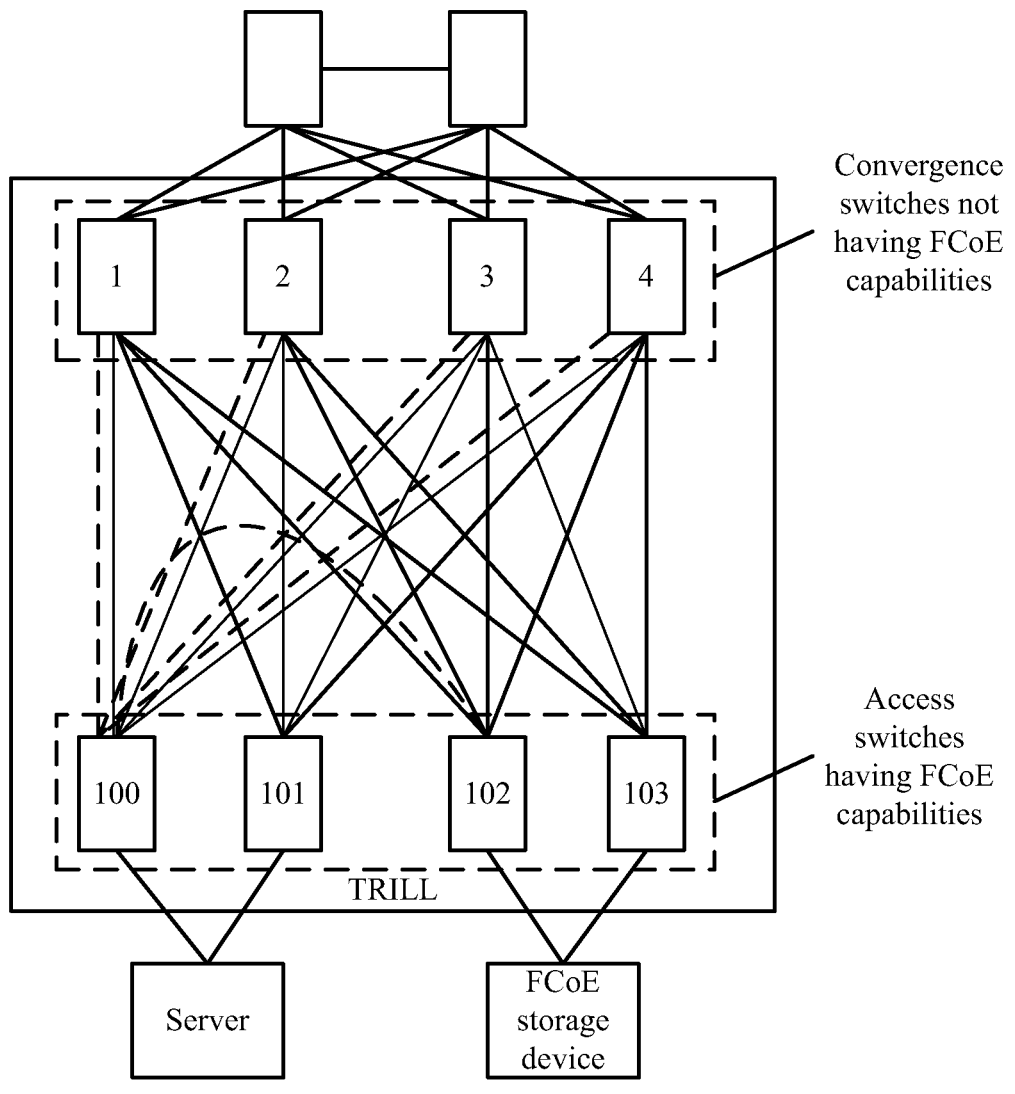
FIG. 1 is a schematic diagram illustrating an FCoE/TRILL convergence network in accordance with examples of the present disclosure.

FIG. 1 is a schematic diagram illustrating an FCoE/TRILL convergence network in accordance with examples of the present disclosure. In the network as shown in FIG. 1, switch 100 and switch 102 belong to a Fabric denoted as Fabric 'A', and switch 101 and switch 103 belong to another Fabric denoted as Fabric 'B'. Fabric 'A' bears TRILL traffic in VLAN 10, Fabric 'B' bears TRILL traffic in VLAN 30, and the TRILL network bears LAN traffic in VLAN 20.

A TRILL multicast tree may be configured for each of the two Fabrics in the network as shown in FIG. 1. The TRILL multicast tree corresponding to Fabric 'A' includes nodes of: all of convergence switches as shown in FIG. 1, i.e., switches 1-4, and all of access switches that belong to Fabric 'A' as shown in FIG. 1, i.e., switches 100 and 102. The TRILL multicast tree corresponding to Fabric 'B' includes nodes of: all of convergence switches as shown in FIG. 1, i.e., switches 1-4, and all of access switches that belong to Fabric 'B' as shown in FIG. 1, i.e., switches 101 and 103. Although FIG. 1 only shows four convergence switches, four access switches and two Fabrics, there may be different quantities of convergence switches and access switches and Fabrics in various examples.

Figure 2:
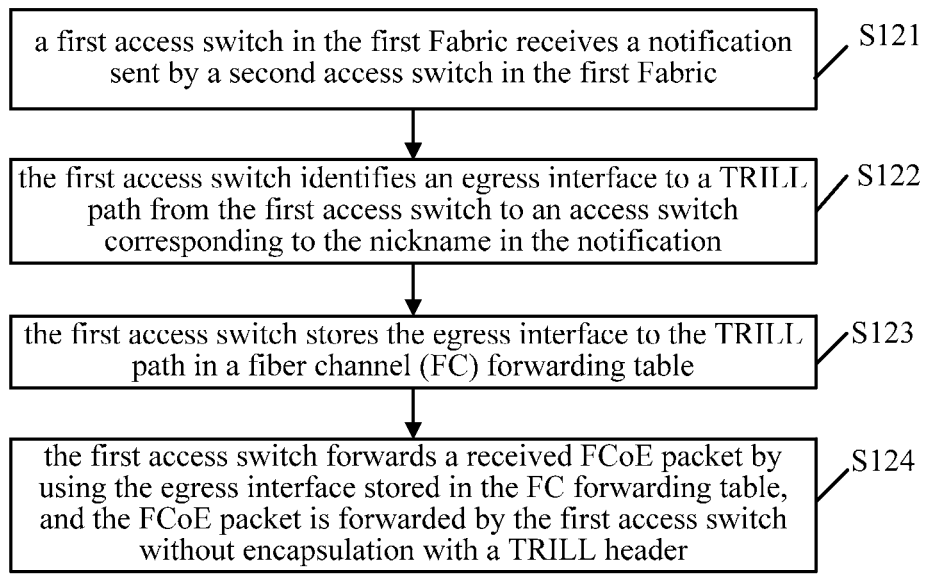
FIG. 2 is a flowchart illustrating a method of forwarding packets in accordance with examples of the present disclosure.

FIG. 2 is a flowchart illustrating a method of forwarding packets in accordance with examples of the present disclosure. The method may include the following procedures.

At block S121, a first access switch in the first Fabric receives a notification sent by a second access switch in the first Fabric. The notification may comprise a nickname of the second access switch.

At block S122, the first access switch identifies an egress interface to a TRILL path from the first access switch to an access switch corresponding to the nickname in the notification.

At block S123, the first access switch stores the egress interface to the TRILL path in a fiber channel (FC) forwarding table.

At block S124, the first access switch forwards a received FCoE packet by using the egress interface stored in the FC forwarding table, and the FCoE packet is forwarded by the first access switch without encapsulation with a TRILL header.

In an example, the procedure of forwarding the received FCoE packet may include: after receiving the FCoE packet, the first access switch searches the FC forwarding table for an FC forwarding table entry that includes a VLAN and a domain ID of a domain to which a destination FC ID in the FCoE packet belongs, and forwards the FCoE packet via an egress interface in the FC forwarding table entry found.

In an example, the first access switch may send a second notification, which comprises a nickname of the first access switch, periodically to plural convergence switches and access switches that are in a Fabric where the first access switch belongs except the first access switch to enable each of the access switches that received the second notification to record in an FC forwarding table an egress interface to a TRILL path between the access switch to the first access switch corresponding to the nickname in the second notification.

In an example, the procedure of identifying an egress interface to a TRILL path from the first access switch to an access switch corresponding to the nickname in the notification may include: the first access switch takes at least one egress interface of at least one TRILL path calculated in advance from the first access switch to the access switch corresponding to the nickname as the egress interface.

In an example, the procedure of forwarding the FCoE packet via an egress interface identified in the FC forwarding table entry found may include: the first access switch replaces a source MAC address and a destination MAC address in a MAC header of the FCoE packet with a MAC address of the first access switch and a MAC address identified in the FC forwarding table entry found; forwards the FCoE packet in which the source MAC address and the destination MAC address in the MAC header have been replaced via an egress interface identified in the FC forwarding table entry found.

In an example, the first access switch may configure in advance at least one TRILL multicast tree which is corresponding to at least one Fabric in the TRILL network, the number of the at least one TRILL multicast tree being identical to the number of the at least one Fabric in the TRILL network. A TRILL multicast tree corresponding to a Fabric comprises nodes of: all of the convergence switches, and all of access switches in the Fabric. The procedure of sending a second notification periodically to the convergence switches and access switches in the Fabric to which the first access switch belongs may include: the first access switch searches all of the at least one TRILL multicast tree configured in advance for a TRILL multicast tree corresponding to the Fabric to which the first access switch belongs; and sends the second notification periodically to nodes in the TRILL multicast tree found except the first access switch.

Figure 3:
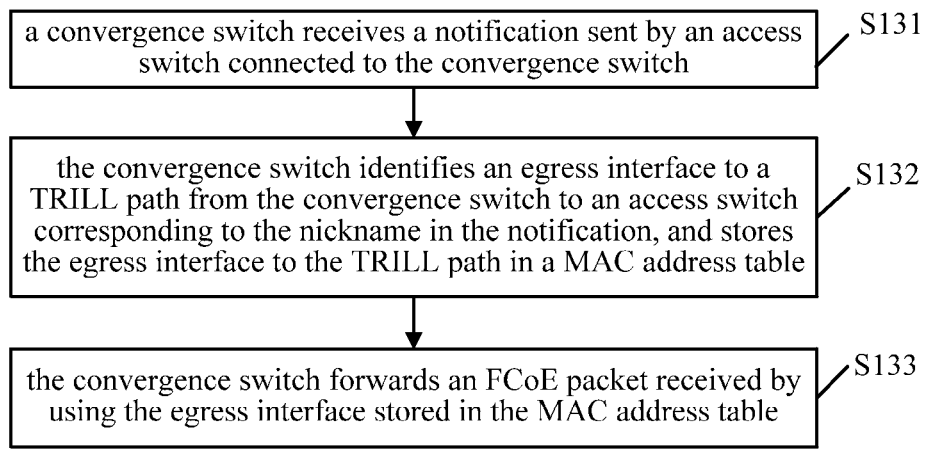
FIG. 3 is a flowchart illustrating a method of forwarding packets in accordance with examples of the present disclosure.

FIG. 3 is a flowchart illustrating a method of forwarding packets in accordance with examples of the present disclosure. The method may include the following procedures.

At block S131, a convergence switch receives a notification sent by an access switch connected to the convergence switch. The notification may include a nickname of the access switch.

At block S132, the convergence switch identifies an egress interface to a TRILL path from the convergence switch to an access switch corresponding to the nickname in the notification, and stores the egress interface to the TRILL path in a MAC address table.

At block S133, the convergence switch forwards an FCoE packet received by using the egress interface stored in the MAC address table.

In an example, the procedure of identifying an egress interface to a TRILL path from the convergence switch to an access switch corresponding to the nickname in the notification may include: the convergence switch takes at least one egress interface of at least one TRILL path calculated in advance from the convergence switch to the access switch corresponding to the nickname as the egress interface.

Figure 10:
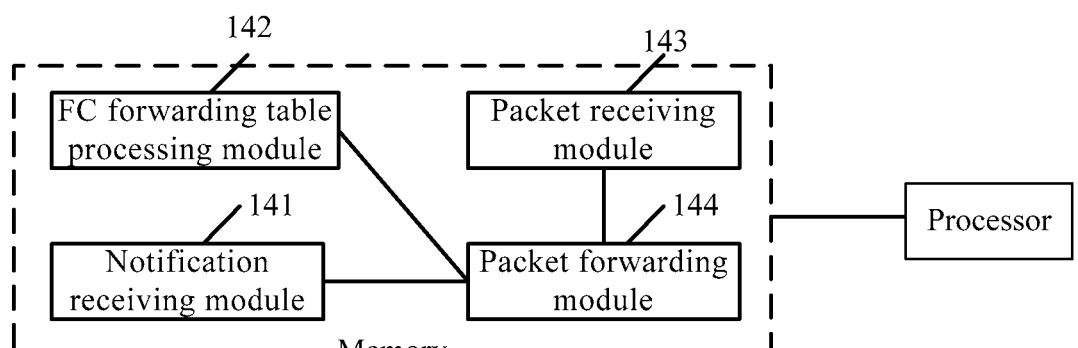
FIG. 10 is a block diagram illustrating modules of an access switch in accordance with examples of the present disclosure.

Various examples also provide an access switch for forwarding fiber channel over Ethernet (FCoE) packets in a transparent interconnection of lots of links (TRILL) network. As shown in FIG. 10, the access switch may include the following components.

An notification receiving module 141 receives a notification sent by one of at least one second access switch, identifying an egress interface to a TRILL path from the access switch to an access switch corresponding to a nickname in the received notification.

An FC forwarding table processing module 142 stores the egress interface to the TRILL path in a fiber channel (FC) forwarding table.

A packet receiving module 143 receives an FCoE packet.

A packet forwarding module 144 forwards the received FCoE packet by using the egress interface stored in the FC forwarding table.

The access device may also include a processor and a non-statutory memory, and the notification receiving module 141, the FC forwarding table processing module 142, the packet receiving module 143, and the packet forwarding module 144 may be embodied as machine-readable instructions stored in the memory to cause the processor to perform the operations described above in connection to the modules 141-144.

In an example, the packet forwarding module may search the FC forwarding table for an FC forwarding table entry which includes a VLAN in the FCoE packet and a domain ID of a domain to which a destination FC ID in the FCoE packet belongs, and forward the FCoE packet via an egress interface identified in the FC forwarding table entry found.

In an example, the access switch may also include: a notification sending module to send a second notification periodically to convergence switches and the at least one second access switch that is in a Fabric where the first access switch belongs. The second notification comprising: a nickname of the access switch.

In an example, the packet forwarding module may replace a source MAC address and a destination MAC address in a MAC header of the FCoE packet with a MAC address of the access switch and a MAC address identified in the FC forwarding table entry found; and forward the FCoE packet in which the source MAC address and the destination MAC address in the MAC header have been replaced via an egress interface identified in the FC forwarding table entry found.

In an example, the notification sending module may search at least one pre-configured TRILL multicast tree for a TRILL multicast tree corresponding to the Fabric to which the access switch belongs, and send the second notification periodically to nodes in the TRILL multicast tree found except the access switch. The at least one pre-configured TRILL multicast trees is corresponding to at least one Fabric in the TRILL network, and the number of the at least one TRILL multicast tree equals the number of the at least one Fabrics in the TRILL network, a TRILL multicast tree corresponding to a Fabric includes nodes of: all of convergence switches, and all of access switches in the Fabric.

In an example, the notification receiving module may take at least one egress interface of at least one TRILL path calculated in advance from the access switch to the access switch corresponding to the nickname as the egress interface.

Figure 13:
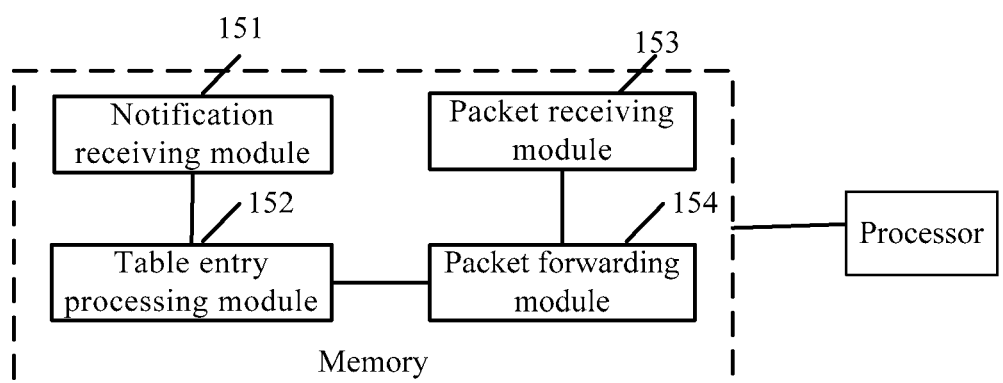
FIG. 13 is a block diagram illustrating modules of a convergence switch in accordance with examples of the present disclosure.

Various examples also provide a convergence switch for forwarding fiber channel over Ethernet (FCoE) packets in a transparent interconnection of lots of links (TRILL) network. As shown in FIG. 13, the convergence switch may include the following modules.

A notification receiving module 151 receives a notification sent by an access switch connected to the convergence switch. The notification may include a nickname of the access switch.

A table entry processing module 152 determines an egress interface to a TRILL path from the convergence switch to an access switch corresponding to the nickname in the notification, stores the egress interface into in a MAC address table;

A packet receiving module 153 receives an FCoE packet.

A packet forwarding module 154 forwards the FCoE packet by using the egress interface stored in the MAC address table.

The access device may also include a processor and a non-statutory memory, and the notification receiving module 151, the table entry processing module 152, the packet receiving module 1453, and the packet forwarding module 154 may be embodied as machine-readable instructions stored in the memory to cause the processor to perform the operations described above in connection to the modules 151-154.

Figure 4:
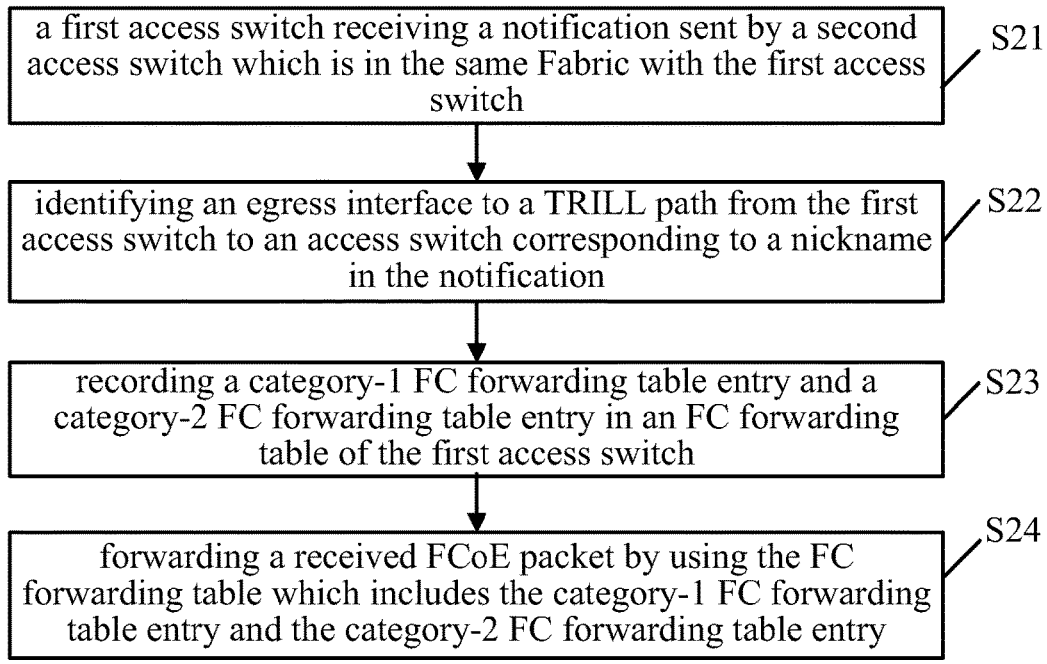
FIG. 4 is a flowchart illustrating a method of forwarding packets in accordance with examples of the present disclosure.

FIG. 4 is a flowchart illustrating a method of forwarding packets in accordance with examples of the present disclosure. The method may include the following procedures.

At block S21, a first access switch receives a notification sent by a second access switch which belongs to the same Fabric with the first access switch. The notification may include: a nickname of the second access switch, an FCoE VLAN, a MAC address of a VE-port and a domain ID.

The nickname of an access switch is an identity of the access switch used in forwarding processes in a TRILL network.

The FCoE VLAN of an access switches refers to a VLAN ID of a VLAN configured in the access switch.

The VE-port of an access switch refers to a port of the access switch that is connected with another switch in the same Fabric. An access switch may have multiple VE-ports, and each of the VE-ports may have a unique MAC address. The notification may include MAC addresses of all of VE-ports that are connected with other switches in the same Fabric with the access switch.

The domain ID of an access switch refers to an identity of a domain to which the access switch belongs.

At block S22, an egress interface to a TRILL path from the first access switch to the second access switch corresponding to the nickname in the notification is identified.

At block S23, a category-1 FC forwarding table entry is recorded in an FC forwarding table of the first access switch. The category-1 FC forwarding table entry includes the domain ID, the FCoE VLAN, the MAC address of the VE-port in the notification and the egress interface to the TRILL path. The FC forwarding table also records a category-2 forwarding table entry which includes an egress interface of the first access switch via which a terminal accesses the first access switch, the MAC address of the terminal, an identity of a fiber channel (FC ID) and a VLAN.

Taking the network as shown in FIG. 1 as an example, switch 100 takes the TRILL multicast tree corresponding to the Fabric to which switch 100 belongs as the communication channel on the control plane, and sends notifications periodically to all nodes in the TRILL multicast tree except switch 100, i.e., convergence switches 1-4 and switch 102 in Fabric 'A' as shown in FIG. 1. The dotted lines in FIG. 1 illustrate the paths followed by notifications sent by switch 100.

Switch 102 may receive the notification sent by switch 100 (block S21). The notification may include the nickname of switch 100, a VLAN ID (i.e., VLAN 10), a MAC address of each VE-port connected to convergence switches 1-4 and access switch 102, and a domain ID of switch 100. A switch may have plural different MAC addresses, e.g., switch 100 may have plural VE-ports. Each two access switches in the same Fabric are connected by a VE-port. Each VE-port has a unique MAC address.

Switch 102 may calculate one or multiple TRILL paths to switch 100 by using the nickname in the notification sent by switch 100 and TRILL routes calculated in advance, and take an egress interface of each of the one or multiple TRILL paths as an egress interfaces to a next hop in a forwarding table corresponding to the domain ID (block S22). The TRILL routes calculated in advance are routes from the switch to each node in the TRILL network obtained by using a routing protocol, e.g., IS-IS (Intermediate System-to-Intermediate System) protocol.

Switch 102 may record a category-1 FC forwarding table entry for the notification (block S23). The category-1 FC forwarding table entry may include: a domain ID of switch 100, VLAN 10, MAC addresses of VE-ports of switch 100 that are connected to other switches, and the one or multiple egress interfaces obtained at block S22.

At block S24, the first access switch forwards received FCoE packets by using the FC forwarding table which stores the category-1 FC forwarding table entry and the category-2 FC forwarding table entry.

Figure 5:
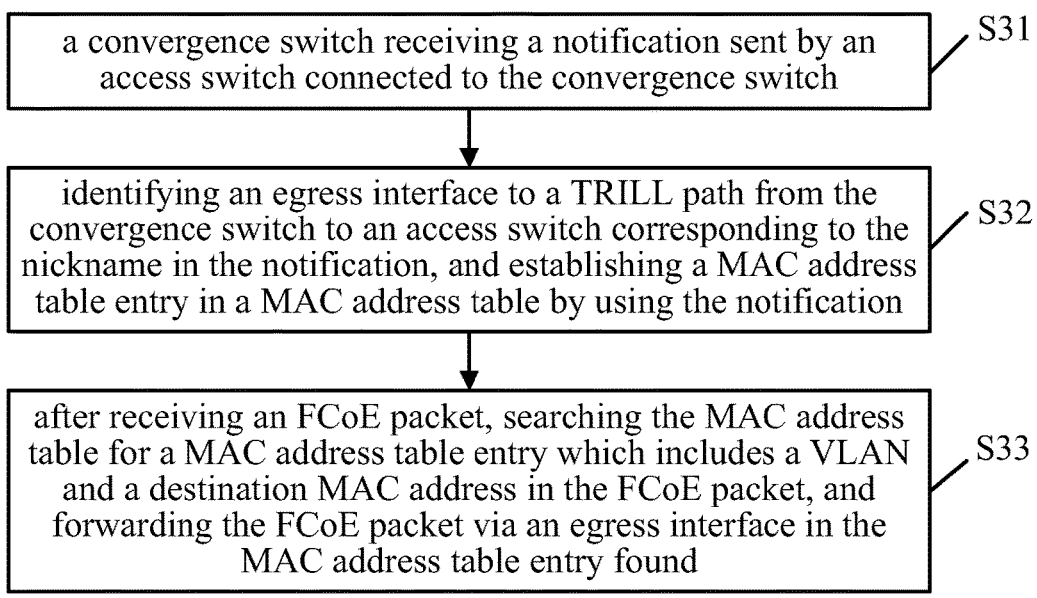
FIG. 5 is a flowchart illustrating a method of forwarding packets in accordance with examples of the present disclosure.

FIG. 5 is a flowchart illustrating a method of forwarding packets in accordance with examples of the present disclosure. The method enables forwarding FCoE packets in a TRILL network. The TRILL network may include access switches and convergence switches, and the access switches have FCoE forwarding capabilities. Access switches within the same Fabric (Fiber network) are interconnected logically in a full meshed manner through VE_ports (virtual Ethernet ports). Access switches in one Fabric are configured with the same FCoE VLAN. The method may include the following procedures.

At block S31, a convergence switch receives a notification sent by an access switch connected to the convergence switch. The notification may include: a nickname of the access switch, an FCoE VLAN, a MAC address of a VE-port, and a domain ID.

At block S32, the convergence switch determines an egress interface to a TRILL path from the convergence switch to an access switch corresponding to the nickname in the notification, establishes a MAC address table entry in a MAC address table by using the MAC address and the FCoE VLAN in the notification and the egress interface to the TRILL path.

Still taking the network as shown in FIG. 1 as an example, a convergence switch (e.g., any one of switches 1-4) may receive a notification sent by switch 100 (block S31). The notification may include the nickname of switch 100, a VLAN ID (i.e., VLAN 10), a MAC address of each VE-port that is connected to one of convergence switches 1-4 and access switch 102, and domain ID of switch 100.

The convergence switch may calculate one or multiple TRILL paths to switch 100 by using the nickname in the notification sent by switch 100 and TRILL routes calculated in advance, take an egress interface of each of the one or multiple TRILL paths as an egress interfaces to a next hop in a forwarding table corresponding to the domain ID (block S32), and establish a MAC address table entry by using the notification. The MAC address table entry may include: the nickname of switch 100, VLAN 10, a MAC address of each VE-port of switch 100 that is connected to other switches and the one or multiple egress interface obtained.

At block S33, after an FCoE packet is received, the convergence switch searches the MAC address table for a MAC address table entry which includes a VLAN and a destination MAC address in the FCoE packet, and forwards the FCoE packet via an egress interface identified in the MAC address table entry found.

Figure 6:
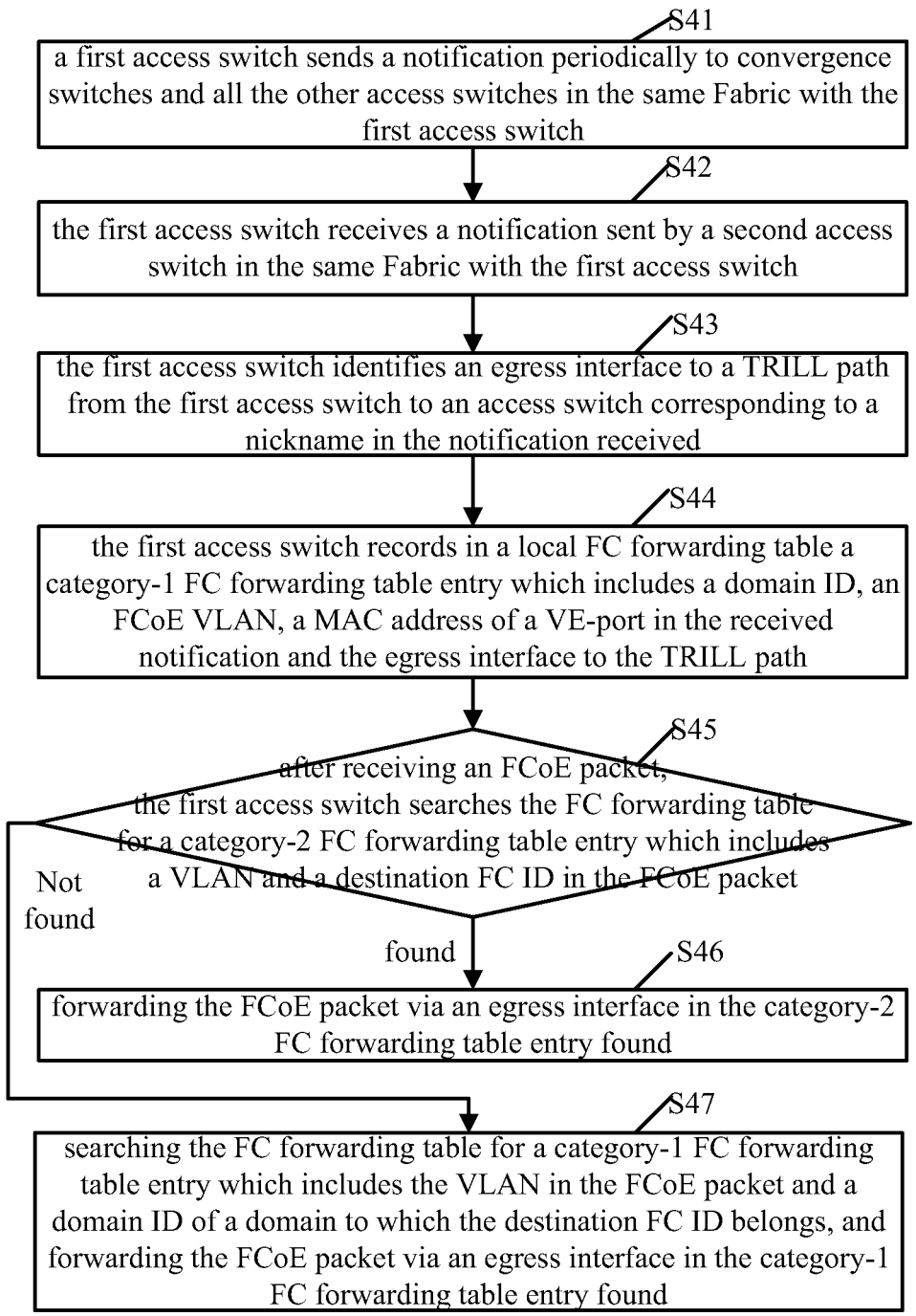
FIG. 6 is a flowchart illustrating a method of forwarding packets in accordance with examples of the present disclosure.

FIG. 6 is a flowchart illustrating a method of forwarding packets in accordance with examples of the present disclosure. The method may include the following procedures.

At block S41, a first access switch sends a notification periodically to convergence switches and all the other access switches that belong to the same Fabric with the first access switch.

In an example, the notification sent by the first access switch may include: a nickname of the first access switch in the TRILL network, an FCoE VLAN supported by the first access switch, a MAC address of a VE-port of the first access switch, and a domain ID of a domain to which the first access switch belongs. In an example, the notification may include MAC addresses of all of ports of the first access switch that are connected with the other switches in the same Fabric with the first access switch. The FCoE VLAN of the first access switch refers to a VLAN ID of a VLAN configured in the first access switch.

In an example, an access switch may send the notification periodically to convergence switches and the other access switches in the same Fabric in a point-to-point manner.

In an example, at least one TRILL multicast tree may be configured in advance in the TRILL network. Each TRILL multicast tree is corresponding to a Fabric in the TRILL network, and the number of TRILL multicast trees equals the number of Fabrics in the TRILL network. Each TRILL multicast tree corresponding to a Fabric may include nodes of: all of convergence switches, and all of access switches that belong to the Fabric. In the network as shown in FIG. 1, switch 100 and switch 102 belong to one Fabric, which is denoted as Fabric 'A', and switch 101 and switch 103 belong to another Fabric, which is denoted as Fabric 'B'. A TRILL multicast tree may be configured for each of the two Fabrics in the network as shown in FIG. 1. The TRILL multicast tree corresponding to Fabric 'A' includes nodes of: all of convergence switches as shown in FIG. 1, i.e., switches 1-4, all of access switches that belong to Fabric 'A' as shown in FIG. 1, i.e., switches 100 and 102. The TRILL multicast tree corresponding to Fabric 'B' includes nodes of: all of convergence switches as shown in FIG. 1, i.e., switches 1-4, all of access switches that belong to Fabric 'B' as shown in FIG. 1, i.e., switches 101 and 103. Taking switch 100 as an example, switch 100 takes a TRILL multicast tree corresponding to the Fabric to which switch 100 belongs, i.e., Fabric 'A', as a communication channel on the control plane, and periodically sends notifications to all of nodes in the TRILL multicast tree except switch 100, i.e., all of convergence switches 1-4 and switch 102 in Fabric 'A' as shown in FIG. 1. The dotted lines in FIG. 1 illustrate the paths followed by notifications sent by switch 100. Likewise, switches 101-103 may also send notifications periodically in the same way as switch 100. Notifications sent by each of switches 101-103 follow paths from the switch to each convergence switch and to the other switch in the same Fabric which are not illustrated in FIG. 1

At block S42, the first access switch receives a notification sent by a second access switch that belongs to the same Fabric with the first access switch.

At block S43, the first access switches identifies an egress interface to a TRILL path from the first access switch to an access switch corresponding to the nickname in the received notification.

In an example, the first access switch may identify the egress interface to the TRILL path from the first access switch to the access switch corresponding to the nickname in the notification by using TRILL routing information calculated before block S33 is performed. The number of egress interface to the TRILL path determined may equal or be more than 1, i.e., it is possible that plural egress interfaces direct to the same destination MAC address.

At block S44, the first access switch records a category-1 FC forwarding table entry in a local FC forwarding table. The category-1 FC forwarding table entry may include: the domain ID, the FCoE VLAN, the MAC addresses of VE-ports in the received notification, and the egress interface to the TRILL path.

In an example, the FC forwarding table may also include a category-2 FC forwarding table. The category-2 FC forwarding table entry may include: an egress interface of the first access switch via which a terminal accesses the first access switch, a MAC address of the terminal, an identity of a fiber channel (FC ID) and a VLAN. The principle of generating the category-2 FC forwarding table entry is similar to that of generating FC forwarding table entries of a conventional FC forwarding table.

At block S45, after an FCoE packet is received, the first access switch first searches the FC forwarding table for a category-2 FC forwarding table entry that includes a VLAN and a destination FC ID in the FCoE packet, the procedure in block S46 is performed if the category-2 FC forwarding table entry is found, and the procedure in block S47 is performed if the category-2 FC forwarding table entry is not found.

In an example, in block S45, the first access switch may take the VLAN and the destination FC ID in the FCoE packet as key words and search all of category-2 FC forwarding table entries in the FC forwarding table for a category-2 FC forwarding table entry that includes the key words.

At block S46, the first access switch forwards the FCoE packet via an egress interface identified in the category-2 forwarding table entry found. The process is finished.

In an example, the procedure in block S46 may also include:

replacing a source MAC address and a destination MAC address in a MAC header of the FCoE packet with the MAC address of the first access switch and the MAC address in the category-2 FC forwarding table entry found;

forwarding the FCoE packet in which the source MAC address and the destination MAC address in the MAC header have been replaced via an egress interface in the category-2 FC forwarding table entry found.

At block S47, the first access switch searches the FC forwarding table for a category-1 FC forwarding table entry which includes the VLAN in the FCoE packet and a domain ID of a domain to which the destination FC ID in the FCoE packet belongs, and forwards the FCoE packet via an egress interface identified in the category-1 forwarding table entry found. The process is finished.

In an example, the first access switch may first identify the domain ID of the domain to which the destination FC ID belongs in block S47. For example, the first 8 bits of the destination FC ID in the FCoE packet may be determined as the domain ID of the domain to which the destination FC ID belongs. The first access switch may then take the domain ID determined and the VLAN in the FCoE packet as key words, search all of category-1 FC forwarding table entries in the FC forwarding table for a category-1 FC forwarding table entry that includes the key words, and forward the FCoE packet via an egress interface in the category-1 FC forwarding table entry found.

In an example, the procedure of forwarding the FCoE packet via an egress interface in the category-1 FC forwarding table entry found in block S47 may include:

replacing a source MAC address and a destination MAC address in a MAC header of the FCoE packet with the MAC address of the first access switch and a MAC address in the category-1 FC forwarding table entry found;

forwarding the FCoE packet in which the source MAC address and the destination MAC address in the MAC header have been replaced via an egress interface in the category-1 FC forwarding table entry found.

In an example, if the category-1 FC forwarding table entry includes plural equivalent egress interfaces, an egress interface may be selected from the egress interfaces by using a Hash algorithm for forwarding the packets.

Figure 7:
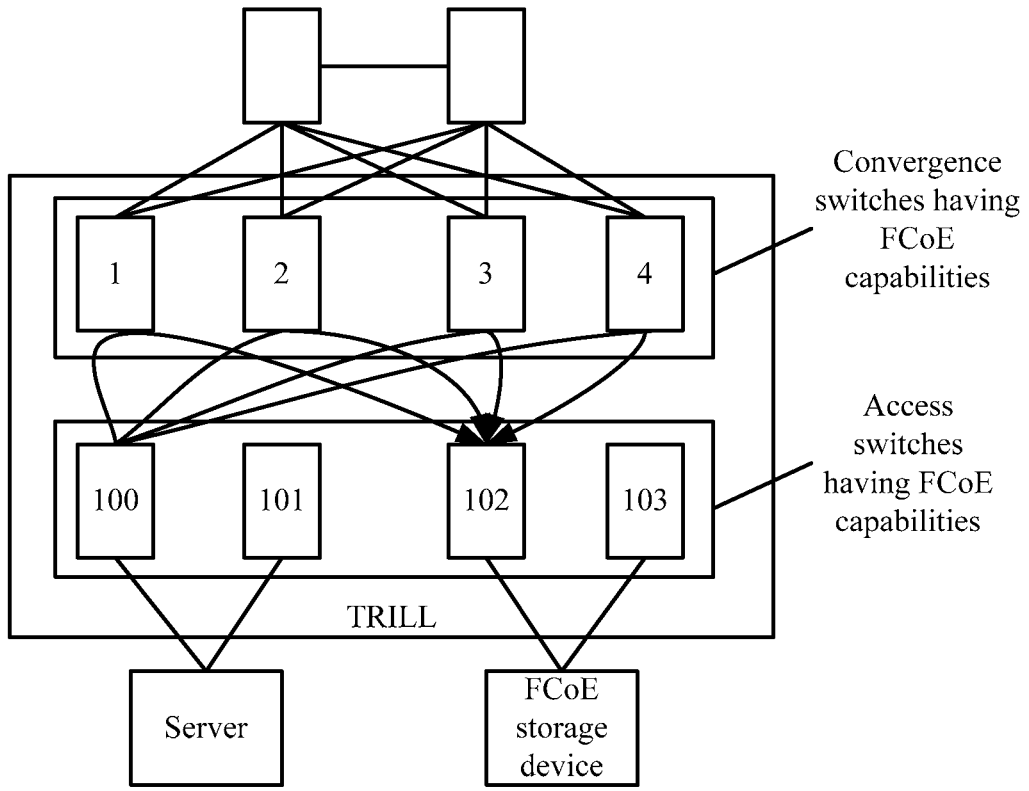
FIG. 7 is a schematic diagram illustrating application of a method in accordance with examples of the present disclosure.

According to the process as shown in FIG. 6, an FCoE packet in the TRILL network does not have to be looped back via the loopback port of the access switch when is received by the access switch, but is directly forwarded by the access switch according to a category-2 FC forwarding table entry or a category-1 FC forwarding table entry in an FC forwarding table. FIG. 7 only illustrates forwarding paths of switch 100 forwarding FCoE packets. As shown in FIG. 7, switch 100 may forward an FCoE packet to switch 102 via any one of switches 1, 2, 3 and 4. The mechanism of the examples can improve forwarding performances of forwarding FCoE packets in a TRILL network so that the forwarding performances are no longer restricted by the number of loopback ports and bandwidth.

In an example, when a convergence switch receives a notification sent by an access switch, the convergence switch may identify an egress interface to a TRILL path from the convergence switch to an access switch corresponding to the nickname in the notification, and establish a MAC address table entry in a MAC address table by using a MAC address and an FCoE VLAN in the notification and the egress interface to the TRILL path.

After receiving an FCoE packet, the convergence switch forwards the FCoE packet directly on layer-2 according to the MAC address table. For example, the convergence switch may search the MAC address table for a MAC address table entry which includes a VLAN and a destination MAC address in the FCoE packet, and forward the FCoE packet via an egress interface in the MAC address table entry found.

Therefore, after receiving an FCoE packet, the convergence switch processes the FCoE packet in the same way as processing a normal Ethernet packet, instead of performing TRILL encapsulation and forwarding as in the conventional art, which reduces requirements of the capabilities of the convergence switch and also reduces costs.

Figure 8:
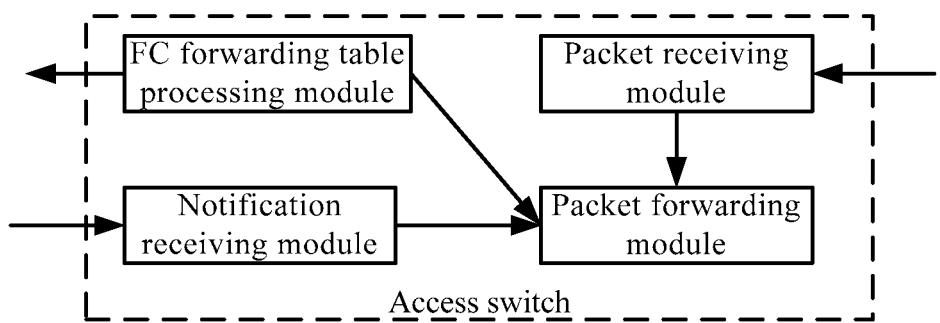
FIG. 8 is a block diagram illustrating modules of an access switch in accordance with examples of the present disclosure.

FIG. 8 is a block diagram illustrating modules of an access switch in accordance with examples of the present disclosure. In an example, the access switch has FCoE forwarding capabilities, is connected logically with other access switches in the same Fabric in a full meshed manner, and is configured with the same FCoE VLAN as the other access switches in the same Fabric.

As shown in FIG. 8, the access switch may include: a notification receiving module, an FC forwarding table processing module, a packet receiving module and a packet forwarding module.

The notification receiving module receives a notification sent by a second access switch in the Fabric where the access switch belongs, and determines an egress interface to a TRILL path from the access switch to an access switch corresponding to a nickname in the notification. The notification may include: a nickname of the second access switch, an FCoE VLAN, a MAC address of a VE-port, and a domain ID.

The FC forwarding table processing module records a category-1 FC forwarding table entry and a category-2 FC forwarding table entry in an FC forwarding table in the access switch. The category-1 FC forwarding table entry may include: the domain ID, the FCoE VLAN, the MAC address of the VE-port in the notification and the egress interface to the TRILL path. The category-2 FC forwarding table entry may include: an egress interface via which a terminal is connected to the access switch, a MAC address of the terminal, an identity of a fiber channel (FC ID) and a VLAN.

The packet receiving module receives an FCoE packet.

The packet forwarding module forwards the received FCoE packet by using the FC forwarding table which stores the category-1 FC forwarding table entry and the category-2 FC forwarding table entry.

In an example, the packet forwarding module may search the FC forwarding table for a category-2 FC forwarding table entry which includes the VLAN and a destination FC ID in the FCoE packet; if the category-2 FC forwarding table entry is found, forward the FCoE packet via an egress interface identified in the category-2 FC forwarding table entry found; if the category-2 FC forwarding table entry is not found, search in the FC forwarding table for a category-1 FC forwarding table entry that includes the VLAN in the FCoE packet and a domain ID of a domain to which the destination FC ID in the FCoE packet belongs, and forward the FCoE packet via an egress interface identified in the category-1 FC forwarding table entry found.

In an example, the access switch may also include a notification sending module. The notification sending module sends a notification periodically to convergence switches and other access switches that belong to the same Fabric with the access switch. The notification may include: a nickname of the access switch, an FCoE VLAN, a MAC address of a VE-port, and a domain ID.

In an example, the packet forwarding module may replace a source MAC address and a destination MAC address in a MAC header of the FCoE packet with the MAC address of the access switch and the MAC address in the category-2 FC forwarding table entry found; and forward the FCoE packet in which the source MAC address and the destination MAC address in the MAC header have been replaced via an egress interface in the category-2 FC forwarding table entry found.

In an example, the packet forwarding module may replace a source MAC address and a destination MAC address in a MAC header of the FCoE packet with the MAC address of the access switch and the MAC address in the category-1 FC forwarding table entry found; and forward the FCoE packet in which the source MAC address and the destination MAC address in the MAC header have been replaced via an egress interface in the category-1 FC forwarding table entry found.

In an example, the notification sending module may search all TRILL multicast trees configured in advance for a TRILL multicast tree corresponding to the Fabric to which the access switch belongs. The TRILL multicast trees configured in advance are corresponding to Fabrics in the TRILL network, and the number of TRILL multicast trees equals the number of Fabrics in the TRILL network. A TRILL multicast tree corresponding to a Fabric includes nodes of: all of convergence switches, and all of access switches in the Fabric.

The notification sending module may send the notification periodically to other nodes in the found TRILL multicast tree except the access switch.

Figure 9:
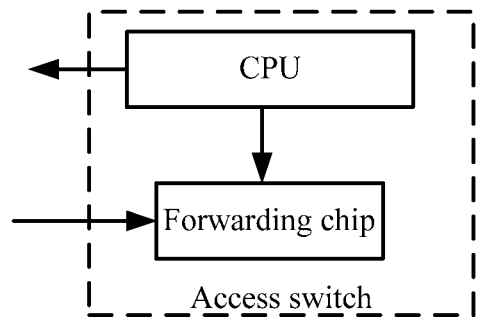
FIG. 9 is a block diagram illustrating modules of an access switch in accordance with examples of the present disclosure.

FIG. 9 is a block diagram illustrating modules of an access switch in accordance with examples of the present disclosure. As shown in FIG. 9, the access switch may include a CPU and a forwarding chip.

The CPU receives a notification sent by a second access switch in the Fabric where the access switch belongs, and determines an egress interface to a TRILL path from the access switch to an access switch corresponding to a nickname in the received notification. The received notification may include: a nickname of the second access switch, an FCoE VLAN, a MAC address of a VE-port, and a domain ID. The CPU records a category-1 FC forwarding table entry in a local FC forwarding table. The category-1 FC forwarding table entry may include a domain ID, an FCoE VLAN, a MAC address of a VE-port in the notification, and the egress interface to the TRILL path. The FC forwarding table may also record a category-2 FC forwarding table entry which includes an egress interface of the access switch via which a terminal is connected to the access switch, a MAC address of the terminal, an FC ID and a VLAN.

The forwarding chip receives an FCoE packet, searches the FC forwarding table for a category-2 FC forwarding table entry which includes a VLAN and a destination FC ID in the FCoE packet; if the category-2 FC forwarding table entry is found, forwards the FCoE packet via an egress interface in the category-2 FC forwarding table entry found; if the category-2 FC forwarding table entry is not found, searches the FC forwarding table for a category-1 FC forwarding table entry that includes the VLAN and a domain ID of a domain to which the destination FC ID in the FCoE packet belongs, and forwards the FCoE packet via an egress interface in the category-1 FC forwarding table entry found.

In an example, the CPU may send a notification periodically to convergence switches and other access switches in the Fabric where the access switch belongs. The notification may include: a nickname of the access switch, an FCoE VLAN, a MAC address of a VE-port, and a domain ID.

In an example, the forwarding chip may replace a source MAC address and a destination MAC address in a MAC header of the FCoE packet with the MAC address of the access switch and a MAC address in the category-2 forwarding table entry found, and forward the FCoE packet in which the source MAC address and the destination MAC address have been replaced via an egress interface in the category-2 FC forwarding table entry.

In an example, the forwarding chip may replace a source MAC address and a destination MAC address in a MAC header of the FCoE packet with the MAC address of the access switch and a MAC address in the category-1 forwarding table entry found, and forward the FCoE packet in which the source MAC address and the destination MAC address have been replaced via an egress interface in the category-1 FC forwarding table entry.

In an example, the CPU may search all TRILL multicast trees configured in advance for a TRILL multicast tree corresponding to the Fabric to which the access switch belongs. The TRILL multicast trees configured in advance are corresponding to Fabrics in the TRILL network, and the number of TRILL multicast trees equals the number of Fabrics in the TRILL network. A TRILL multicast tree corresponding to a Fabric includes nodes of: all of convergence switches, and all of access switches in the Fabric.

FIG. 10 is a block diagram illustrating modules of an access switch in accordance with examples of the present disclosure. The access switch may include a processor and a memory. The memory may stores a series of machine-readable instructions which may cause the processor to perform actions to implement the technical mechanism of any example of the present disclosure.

For example, the memory may include instructions corresponding to the notification receiving module, the FC forwarding table processing module, the packet receiving module and the packet forwarding module as shown in FIG. 8 to cause the processor to implement the functions of the modules.

Various examples also provide a convergence switch. The convergence switch is connected to an access switch which has enabled FCoE forwarding capabilities. Access switches within a Fabric are interconnected logically in a full meshed manner via VE-ports, and are configured with the same FCoE VLAN.

Figure 11:
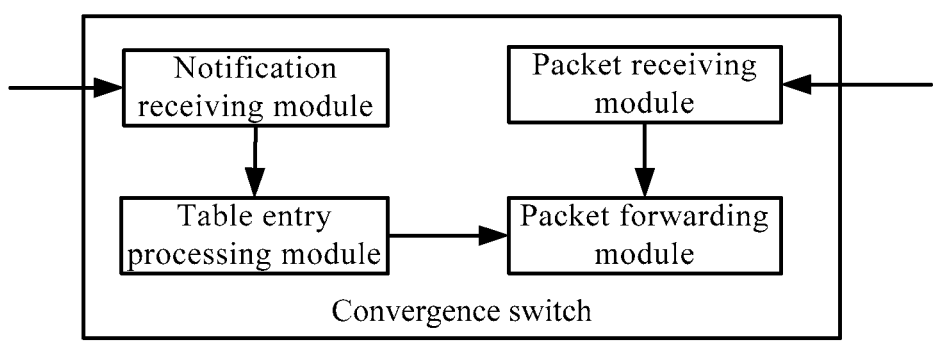
FIG. 11 is a block diagram illustrating modules of a convergence switch in accordance with examples of the present disclosure.

FIG. 11 is a block diagram illustrating modules of a convergence switch in accordance with examples of the present disclosure. As shown in FIG. 11, the convergence switch may include: a notification receiving module, a table entry processing module, a packet receiving module and a packet forwarding module.

The notification receiving module receives a notification sent by an access switch connected to the convergence switch. The notification may include: a nickname of the access switch, an FCoE VLAN, a MAC address of a VE-port, and a domain ID.

The table entry processing module determines an egress interface to a TRILL path from the convergence switch to an access switch corresponding to the nickname in the notification, establishes a MAC address table entry in a MAC address table by using the egress interface to the TRILL path, the MAC address and the FCoE VLAN in the notification.

The packet receiving module receives an FCoE packet.

The packet forwarding module searches the MAC address table for a MAC address table entry which includes a VLAN and a destination MAC address in the FCoE packet, and forwards the FCoE packet via an egress interface in the MAC address table entry found.

Figure 12:
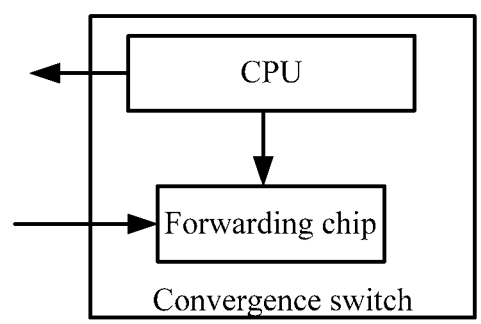
FIG. 12 is a block diagram illustrating modules of a convergence switch in accordance with examples of the present disclosure.

FIG. 12 is a block diagram illustrating modules of a convergence switch in accordance with examples of the present disclosure. As shown in FIG. 12, the convergence switch may include a processor and a forwarding chip.

The CPU receives a notification sent by an access switch which is connected with the convergence switch. The notification may include: a nickname of the access switch, an FCoE VLAN, a MAC address of a VE-port, and a domain ID. The CPU also identifies an egress interface to a TRILL path from the convergence switch to an access switch corresponding to the nickname in the notification, establishes a MAC address table entry in a MAC address table by using the egress interface to the TRILL path, the MAC address and the FCoE VLAN in the notification.

The forwarding chip receives an FCoE packet, searches the MAC address table for a MAC address table entry which includes a VLAN and a destination MAC address in the FCoE packet, and forwards the FCoE packet via an egress interface in the MAC address table entry found.

FIG. 13 is a block diagram illustrating modules of a convergence switch in accordance with examples of the present disclosure. The convergence switch may include a processor and a memory. The memory may stores a series of machine-readable instructions which may cause the processor to perform actions to implement the technical mechanism of any example of the present disclosure.

For example, the memory may include instructions corresponding to the notification receiving module, the table entry processing module, the packet receiving module and the packet forwarding module as shown in FIG. 11 for causing the processor to implement the functions of the modules.

In view of the foregoing examples, an FCoE packet in a TRILL network does not have to be looped back via a loopback port of a switch when received by an access switch, but is directly forwarded by the access switch by using a category-2 FC forwarding table entry or a category-1 FC forwarding table entry in an FC forwarding table. This solves problems of limited forwarding performances and wasting user interface resources resulted in the loop back of FCoE packets via loopback ports, and improves performances of forwarding FCoE packets in the FCoE so that the forwarding performances are no longer restricted by the number of loopback ports and bandwidth.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various embodiments, a module may be implemented by hardware and or machine-executable instructions. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium is also provided, which is to store instructions to cause a machine to execute a method as described herein. Specifically, a system or apparatus having a storage medium which stores machine-readable program codes for implementing functions of any of the above examples and which may make the system or the apparatus (or CPU or MPU) read and execute the program codes stored in the storage medium. In addition, instructions of the program codes may cause an operating system running in a computer to implement part or all of the operations. In addition, the program codes implemented from a storage medium are written in a storage device in an extension board inserted in the computer or in a storage in an extension unit connected to the computer. In this example, a CPU in the extension board or the extension unit executes at least part of the operations according to the instructions based on the program codes to realize the technical scheme of any of the above examples.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

The invention claimed is:

1. A method of forwarding fiber channel over Ethernet (FCoE) packets in a transparent interconnection of lots of links (TRILL) network, comprising:
    receiving, by a first access switch in a first Fabric, a notification sent by a second access switch in the first Fabric, the notification comprising: a nickname of the second access switch;
    identifying, by the first access switch, an egress interface to a TRILL path from the first access switch to the second access switch corresponding to the nickname in the notification;
    storing, by the first access switch, the egress interface to the TRILL path in a fiber channel (FC) forwarding table; and
    forwarding, by the first access switch, a received FCoE packet by using the egress interface stored in the FC forwarding table, said FCoE packet being forwarded by the first access switch without encapsulation with a TRILL header.

2. The method of claim 1,
wherein the forwarding the received FCoE packet comprises:
after receiving the FCoE packet, searching the FC forwarding table for an FC forwarding table entry that includes a VLAN identifier and a domain ID of a domain to which a destination FC ID in the FCoE packet belongs, and forwarding the FCoE packet via the egress interface in the FC forwarding table entry found.

3. The method of claim 2, wherein the forwarding the FCoE packet via an egress interface identified in the FC forwarding table entry found comprises:
replacing a source MAC address and a destination MAC address in a MAC header of the FCoE packet with a MAC address of the first access switch and a MAC address identified in the FC forwarding table entry found respectively;
forwarding the FCoE packet in which the source MAC address and the destination MAC address in the MAC header have been replaced via the egress interface identified in the FC forwarding table entry found.

4. The method of claim 1, further comprising:
sending a second notification, which comprises a nickname of the first access switch, periodically to plural convergence switches and access switches that are in the first Fabric where the first access switch belongs, but not to the first access switch, to enable each of the access switches that received the second notification to record in a respective FC forwarding table an egress interface to a TRILL path between the each access switch to the first access switch corresponding to the nickname in the second notification.

5. The method of claim 4, further comprising:
configuring in advance at least one TRILL multicast tree which is corresponding to at least one Fabric in the TRILL network, the number of the at least one TRILL multicast tree being identical to the number of the at least one Fabric in the TRILL network so a respective TRILL multicast tree is pre-configured for each Fabric of the at least one Fabric;
wherein a TRILL multicast tree corresponding to the first Fabric comprises nodes of: all of the convergence switches, and all of the access switches in the first Fabric;
wherein sending a second notification periodically to the convergence switches and access switches in the first Fabric to which the first access switch belongs comprises:
searching all of the at least one TRILL multicast tree configured in advance for the TRILL multicast tree corresponding to the first Fabric to which the first access switch belongs;
sending the second notification periodically to the nodes in the TRILL multicast tree found but not to the first access switch.

6. The method of claim 1, wherein the identifying by the first access switch an egress interface to a TRILL path from the first access switch to the second access switch corresponding to the nickname in the notification comprises:
taking at least one egress interface of at least one TRILL path calculated in advance from the first access switch to the second access switch corresponding to the nickname as the egress interface.

7. The method of claim 1, further comprising forwarding the FCoE packet without looping the FCoE packet back to a loopback port.

8. The method of claim 7, further comprising forwarding the FCoE packet with looping using by using a category-2 FC forwarding table entry.

9. The method of claim 7, further comprising forwarding the FCoE packet with looping using by using a category-3 FC forwarding table entry.

10. A method of forwarding fiber channel over Ethernet (FCoE) packets in a transparent interconnection of lots of links (TRILL) network, comprising:
receiving, by a convergence switch, a notification sent by an access switch connected to the convergence switch, the notification comprising: a nickname of the access switch;
identifying, by the convergence switch, an egress interface to a TRILL path from the convergence switch to the access switch corresponding to the nickname in the notification, storing the egress interface to the TRILL path in a MAC address table;
forwarding an FCoE packet received by using the egress interface stored in the MAC address table without encapsulation with a TRILL header.

11. The method of claim 10, wherein the identifying by the convergence switch an egress interface to a TRILL path from the convergence switch to an access switch corresponding to the nickname in the notification comprises:
taking at least one egress interface of at least one TRILL path calculated in advance from the convergence switch to the access switch corresponding to the nickname as the egress interface.

12. The method of claim 10, further comprising forwarding the FCoE packet without looping the FCoE packet back to a loopback port.

13. An access switch for forwarding fiber channel over Ethernet (FCoE) packets in a transparent interconnection of lots of links (TRILL) network, comprising:
a notification receiving module, to receive a notification sent by one of at least one second access switch, identifying an egress interface to a TRILL path from the access switch to the one of at least one second access switch corresponding to a nickname in the received notification;
an FC forwarding table processing module, to store the egress interface to the TRILL path in a fiber channel (FC) forwarding table;
a packet receiving module, to receive an FCoE packet;
a packet forwarding module, to forward the received FCoE packet by using the egress interface stored in the FC forwarding table, and
a notification sending module, to:
send a second notification periodically to convergence switches and the at least one second access switch that is in a Fabric where the access switch belongs; and
search a plurality of pre-configured TRILL multicast trees for a TRILL multicast tree corresponding to the Fabric to which the access switch belongs, wherein each of the plurality of pre-configured TRILL multicast trees corresponds to a respective Fabric in the TRILL network.

14. The access switch of claim 13 wherein the packet forwarding module is further to forward the packet by searching the FC forwarding table for an FC forwarding table entry which includes a VLAN identifier in the FCoE packet and a domain ID of a domain to which a destination FC ID in the FCoE packet belongs, and to forward the FCoE packet via the egress interface identified in the FC forwarding table entry found.

15. The access switch of claim 14, wherein the packet forwarding module is to:
   replace a source MAC address and a destination MAC address in a MAC header of the FCoE packet with a MAC address of the access switch and a MAC address identified in the FC forwarding table entry found respectively;
   forward the FCoE packet in which the source MAC address and the destination MAC address in the MAC header have been replaced via the egress interface identified in the FC forwarding table entry found.

16. The access switch of claim 13, where the second notification comprises a nickname of the access switch.

17. The access switch of claim 16, wherein the notification sending module is to:
   send the second notification periodically to nodes in the TRILL multicast tree found but not to the first access switch, and where a TRILL multicast tree corresponding to a Fabric includes nodes of: all of convergence switches, and all of access switches in the Fabric.

18. The access switch of claim 13, wherein the notification receiving module is to:
   take at least one egress interface of at least one TRILL path calculated in advance from the access switch to the one of the at least one second access switch corresponding to the nickname as the egress interface.

19. The access switch of claim 13, wherein the packet forwarding module is further to forward the FCoE packet without looping the FCoE packet back to a loopback port.

20. A convergence switch for forwarding fiber channel over Ethernet (FCoE) packets in a transparent interconnection of lots of links (TRILL) network, comprising:
   a notification receiving module, to receive a notification sent by an access switch connected to the convergence switch, the notification comprising a nickname of the access switch;
   a table entry processing module, to determine an egress interface to a TRILL path from the convergence switch to the access switch corresponding to the nickname in the notification, store the egress interface into in a MAC address table;
   a packet receiving module, to receive an FCoE packet; and
   a packet forwarding module, to forward the FCoE packet by using the egress interface stored in the MAC address table without encapsulation with a TRILL header.

* * * * *